1,728,159

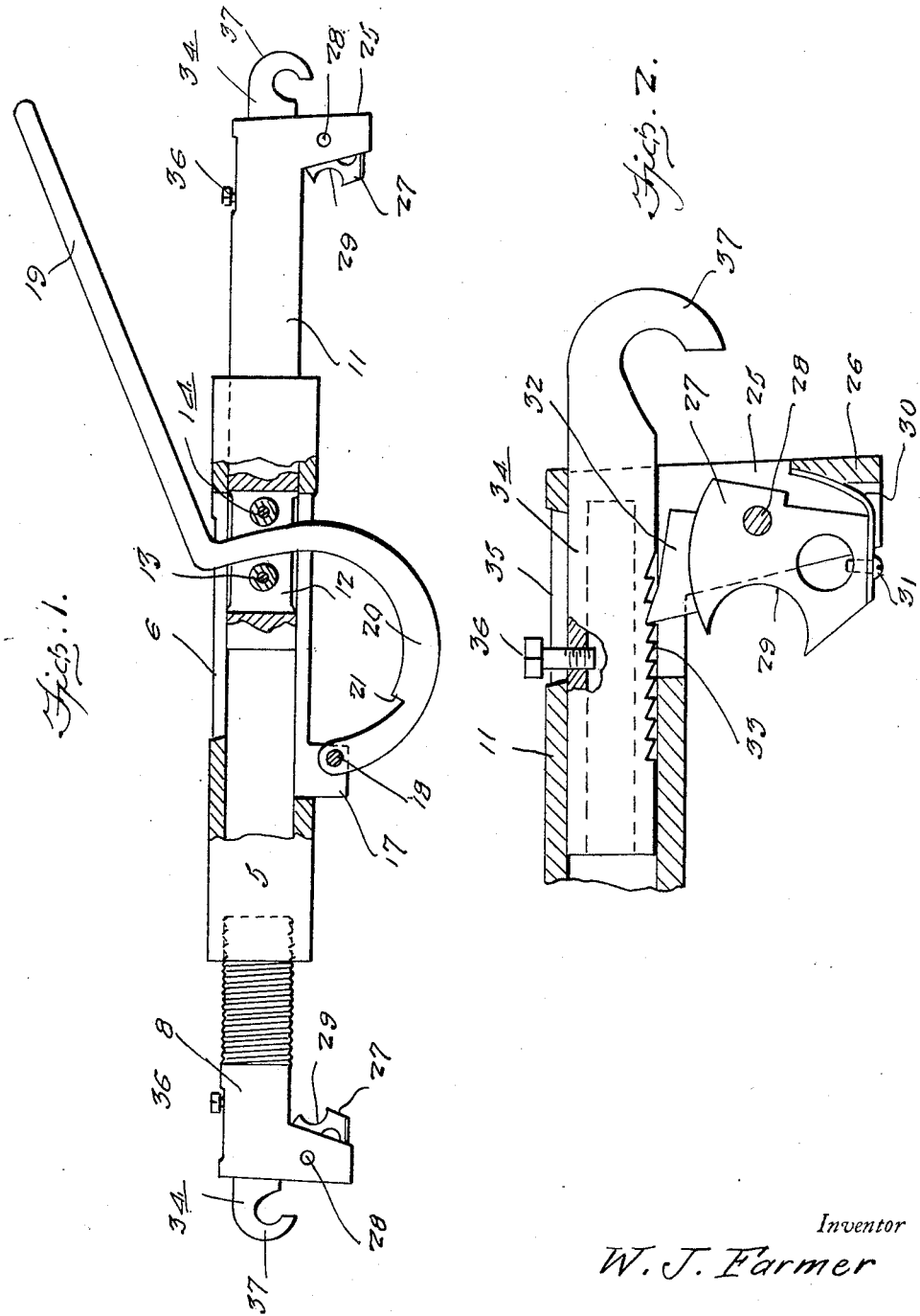
Sept. 10, 1929.     W. J. FARMER     1,728,159
RIM BREAKER
Filed Sept. 25, 1928
Inventor
W. J. Farmer Patented Sept. 10, 1929.

UNITED STATES PATENT OFFICE.

WILLIAM J. FARMER, OF WIRT, OKLAHOMA.

RIM BREAKER.

Application filed September 25, 1928. Serial No. 308,297.

The present invention relates to an automobile tire rim breaker and has for its prime object to provide a device of this nature which is useful in expanding and contracting automobile tire rims and taking off and putting on tire shoes, an operation which is well known in this art.

Another very important object of the invention is to improve and simplify the structure disclosed in Letters Patent 1,660,747 issued to me on February 28, 1928.

In the drawing:

Figure 1 is a sectional elevation of the tool embodying the features of my invention, and Figure 2 is an enlarged sectional view through one end thereof.

Referring to the drawings in detail it will be seen that the numeral 5 denotes an elongated hollow tubular member which is provided intermediate its ends with diametrically opposed longitudinally extending slots 6.

A tubular shank 8 is threaded in one end of the member 5. An elongated tubular shank 11 is slidable through the other end of the hollow tubular member 5 and is provided intermediate its ends with a longitudinally extending slot 12 adapted to register with the slot 6.

Rollers 13 and 14 are journaled in spaced relation in and across the slot 12. Lugs 17 project from the hollow tubular member 5 adjacent one end of one of the slots 6, one lug on each side of said slot so as to pivotally receive therebetween as at 18 a lever 19, the pivoted end of which is curved as is indicated at 20 to form a cam portion.

The lever extends through the slots 6 and 12 and the cam portion 20 is adapted to engage with the rollers 13 and 14 so that as the lever is swung back and forth the cam portion alternately engages the rollers 13 and 14 to telescope the shank 11 into and out of the member 5 as may be desired for contracting or expanding the rim.

When the lever is swung so as to telescope the shank 11, into the member 5, for contracting the rim, the notch 21 on the lever will engage the roller 13, whereby the rim may then be held in contracted position without any further effort on the part of the operator.

The parts thus far described are quite similar to those disclosed in said Letters Patent. My improvement consists particularly in the outer ends of the tubular shanks 8 and 11 and as these ends are identical only one will be described in detail. Thus the end of the shank 11 is provided with a pair of lateral extensions 25 connected by a cross piece 26 at their extremity.

A plate 27 is rockable between the extensions 25 and on a pin 28 and the inner edge of the plate is provided with a finger notch 29. A spring 30 is anchored by a screw 31 to the lower end of the plate and is curved to rest against the connecting member 26.

A pawl or dog 32 is formed on the plate 27 to engage ratchet teeth 33 on an inner shank 34 telescoped in the hollow shank 11. The hollow shank 11 is provided with an elongated slot 35 and a screw 36 is engaged in the hollow shank 34 to move in the slot 35 to limit the longitudinal telescopic movement of the shank 34. The outer end of the shank 34 terminates in a hook 37 which may engage the rim when the rim is to be contracted. The extensions 25 are used to engage the rim when the rim is to be expanded.

Obviously by rocking the plates 29 the pawls 32 may be released for adjusting the shank 34 in the shanks 8 and 11 for the purpose of lengthening or shortening the tube in accordance with the diameter of the rim to be contracted or expanded.

It is thought that the construction, operation, utility and advantages of this invention will now be quite apparent to those skilled in this art without a more detailed description thereof.

The present embodiment has been disclosed in detail since in actual practice it attains the features of advantage enumerated as desirable in the statement of the invention and the above description.

It will be apparent that changes in the details of construction may be resorted to without departing from the spirit or scope of the invention as hereinafter claimed or sacrificing any of its advantages.

Having thus described my invention, what I claim as new is:

1. A rim breaker of the class described comprising a pair of telescopically associated members, means for sliding the members in respect to each other, the ends of the members being hollow and having each a pair of lateral extensions to one side and a longitudinal slot to the other side, shanks slidable in the hollow end, means between the extension for holding the shanks in different adjusted position, and a screw in each shank projecting through the adjacent slot.

2. A rim breaker of the class described comprising a pair of telescopically associated members, means for sliding the members with respect to each other, the ends of the members being hollow and having each a pair of lateral extensions to one side, and a longitudinal slot to the other side, shanks slidable in the hollow end, plates rockable betwen the extensions and having pawls to engage ratchet teeth upon the shank, and said shanks at their outer ends terminating in hooks, and a screw in each shank projecting through the adjacent slot.

3. A rim breaker of the class described comprising a pair of telescopically associated members, means for sliding the members with respect to each other, the ends of the members being hollow and having each a pair of lateral extensions to one side, and a longitudinal slot to the other side, shanks slidable in the hollow end, means between the extensions for holding the shanks in different adjusted positions, said shanks at their outer ends terminating in hooks, and a screw in each shank projecting through the adjacent slot.

4. A rim breaker of the class described comprising a pair of telescopically associated members, means for sliding the members with respect to each other, and an adjustable tubular shank of hollow construction engaged on one end of one of said members, the end of said other member being hollow, said shanks and said last mentioned member having each a pair of lateral extensions to one side and a longitudinal slot to the other side, shanks slidable in the hollow tubular shank and said last mentioned members, means between the extensions for holding the said last mentioned shanks in different adjusted positions, and said last mentioned shanks terminating at their outer ends in hooks, and a screw in each shank projecting through the adjacent slot.

In testimony whereof I affix my signature.

WILLIAM J. FARMER.